United States Patent [19]

Applegate

[11] Patent Number: 4,549,645
[45] Date of Patent: Oct. 29, 1985

[54] FEEDING ARTICLES

[75] Inventor: Barry G. Applegate, London, England

[73] Assignee: Molins plc, London, England

[21] Appl. No.: 547,287

[22] Filed: Oct. 31, 1983

[30] Foreign Application Priority Data

Nov. 11, 1982 [GB] United Kingdom ............... 8232164

[51] Int. Cl.$^4$ ..................... B65G 29/02; B65G 47/24
[52] U.S. Cl. ................. 198/408; 198/468.2; 198/723
[58] Field of Search ............... 198/408, 407, 406, 440, 198/441, 459, 461, 422, 481, 723, 478, 688, 450; 414/757, 758, 761, 69, 81; 271/187, 315, 109

[56] References Cited

U.S. PATENT DOCUMENTS

| | | | |
|---|---|---|---|
| 1,631,150 | 6/1927 | Owen | 198/481 |
| 1,889,908 | 12/1932 | Thompson | 198/408 |
| 1,961,697 | 6/1934 | Little | 198/408 |
| 2,620,058 | 12/1952 | Smith et al. | 198/478 |
| 3,122,234 | 2/1964 | Kagley | 198/478 |
| 3,363,741 | 1/1968 | Dierksheide | 198/481 |
| 4,228,997 | 10/1980 | Schoonmaker et al. | 271/187 |
| 4,238,025 | 12/1980 | Manservisi | 198/450 |
| 4,417,837 | 11/1983 | Pinto et al. | 414/47 |
| 4,470,590 | 9/1984 | Ariga et al. | 271/187 |

FOREIGN PATENT DOCUMENTS

| | | | |
|---|---|---|---|
| 813292 | 5/1937 | France | 414/81 |
| 1031334 | 6/1966 | United Kingdom | 198/688 |
| 1259548 | 1/1972 | United Kingdom | 198/441 |
| 361949 | 2/1973 | U.S.S.R. | 198/481 |

Primary Examiner—Joseph E. Valenza
Assistant Examiner—Daniel R. Alexander
Attorney, Agent, or Firm—John C. Smith, Jr.

[57] ABSTRACT

A device for feeding and orienting cigarette packets includes a driven wheel 10 having a plurality of rearwardly directed resilient members, such as spring arms 12, mounted on the periphery of the wheel. Packets P are fed to the wheel down a twisted chute 20, and they leave from an outlet 23 under the wheel, where the packets are pushed out by the spring arms 12 to form a short stack. At the bottom of the stack each packet is transported away in a regular manner by a flighted horizontal conveyor 27.

13 Claims, 2 Drawing Figures

FEEDING ARTICLES

BACKGROUND OF THE INVENTION

This invention relates to the feeding of flat articles, such as cigarette packets.

In the packaging of cigarettes it is usual for cigarette packets (whether of the hinged lid or soft pack type) to be wrapped in an outer transparent wrapper which includes a tear tab for opening the packet. There are a number of different positions for such tear tabs, consequently it is required for the packets to enter the wrapping machine in the correct orientation.

Where the supply of packets from the packing machine is via a reservoir (such as the Molins packet reservoir known as PACER) the packets may often be unloaded in batches, i.e. in intermittent streams of packets touching end to end, whereas the wrapping machine requires packets to be fed to it in a regular spaced manner.

SUMMARY OF THE INVENTION

It is an object of the present invention to propose a manner of feeding flat articles, such as cigarette packets, which satisfies at least one of these requirements.

According to one aspect of the invention there is provided apparatus for feeding flat articles, such as cigarette packets, having two major axes parallel to their flat faces, comprising a wheel mounted for rotation about a substantially horizontal axis, driving means for continuously rotating the wheel, resilient means formed on the periphery of the wheel for engaging the articles, an upright inlet chute for leading the articles to the wheel in an orientation parallel to one of said major axes, a short substantially vertical outlet extending radially of the wheel for receiving the articles from the wheel in a direction perpendicular to said two major axes, passage means defining a substantially arcuate passage around the wheel between said inlet chute and said outlet, and horizontal conveyor means mounted beneath the outlet for removing the lowermost articles at least one at a time in a direction parallel to one of said major axes.

Preferably the resilient means comprises a plurality of equispaced resilient arms which in use extend backwards relative to the direction of rotation of the wheel. Each arm may be provided at its free end with a rounded enlargement which is engageable with the rear of a respective article.

A portion of the passage means may extend outwards from the axis of the wheel to such a radius that said enlargement is disengageable from the rear of an article. This has the effect of reducing forward forces on the articles downstream of such extended portion of the passage means.

Preferably the angle subtended between the inlet chute and the outlet is less than about 180° but greater than 90°.

According to another aspect of the invention there is provided a method of converting an irregular flow of articles into a regular flow, each article having a pair of opposed flat faces and moving in a direction parallel to its flat faces, comprising the steps of forming a queue of abutting articles from the irregular flow, feeding articles from the front of the queue at an increased speed along a non-linear path, so that a slight gap is formed between the articles, moving each foremost article transversely of the path to form a stack of articles so that their flat faces are abutting, and regularly feeding articles away from the end of the stack.

BRIEF DESCRIPTION OF THE DRAWINGS

An embodiment of the invention will now be described, by way of example only, with reference to the accompanying drawings in which.

DESCRIPTION OF THE PREFERRED EMBODIMENT

Figures 1, 2:
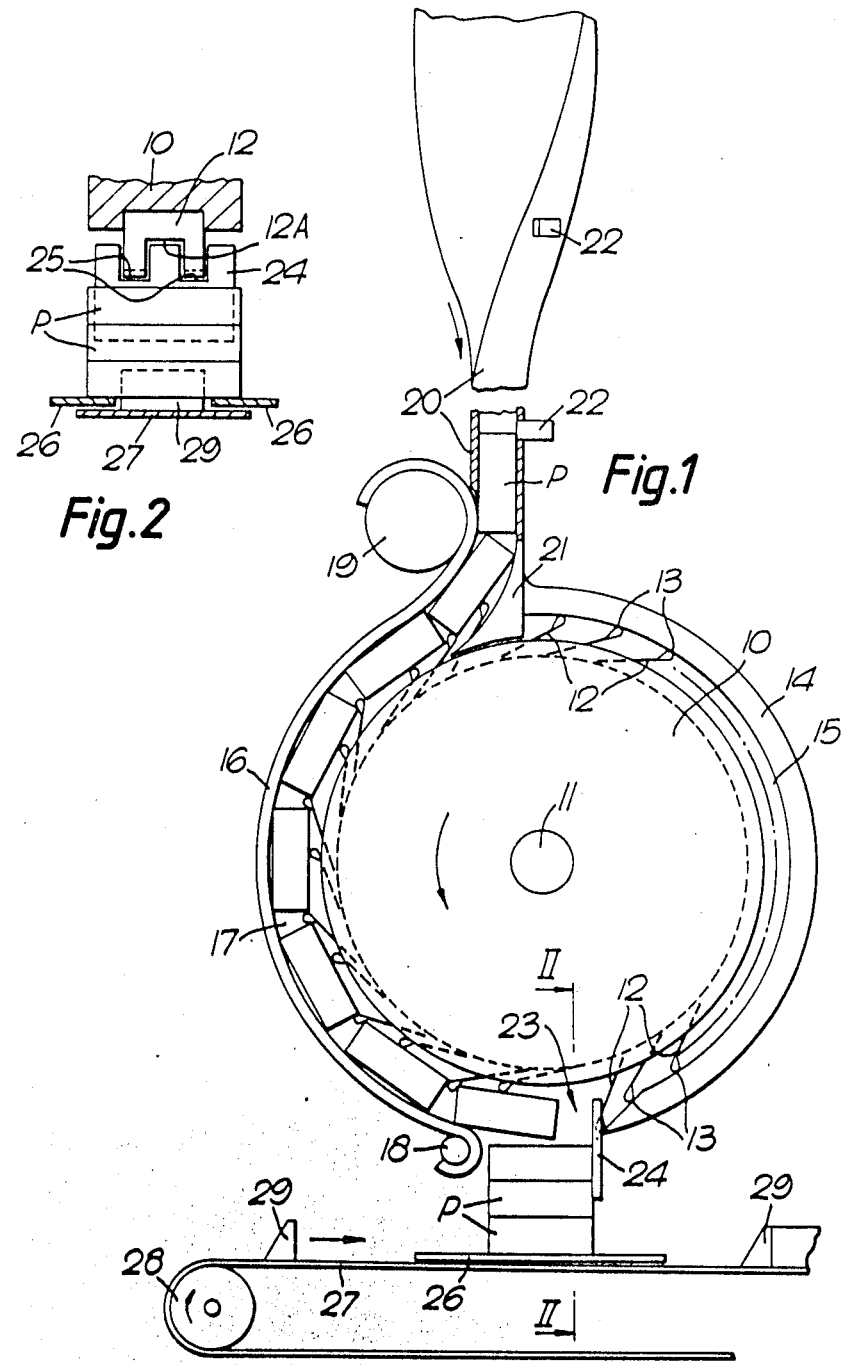
FIG. 1 is a side elevation of an apparatus for feeding cigarette packets.
FIG. 2 is a section taken on the line II—II in FIG. 1.

The apparatus essentially comprises a relatively narrow wheel 10 mounted on a horizontal shaft 11 and driven in an anti-clockwise direction as shown by the arrow. Mounted in an annular groove on the periphery of the wheel are some twenty-five regularly spaced spring arms 12 each having a rounded end 13 formed at its free end. The arms 12, which may be fabricated from spring strip material or moulded from a resilient thermoplastic material, are so mounted that even in their relaxed position they extend backwards relative to the direction of rotation of the wheel. The middle portion of the free end 13 of each arm is provided with a rectangular cut-out 12A (see FIG. 2) thus forming a forked end.

Around the right-hand half of the wheel 10, as viewed in FIG. 1, is an idle passageway 15 formed by a semi-circular wall 14 having a smooth inner surface against which the free ends 13 are in light contact. And around the left-hand half is provided an arcuate passage 17 formed by a thick flexible strip 16 of low friction material, such as polytetrafluoroethylene (PTFE) or ultra-high molecular weight polyethylene (UHMPE).

The lower end of the strip 16 is secured around a fixed member 18, while its upper end extends around a large roller 19 which is normally fixed, but which can be rotationally adjusted to increase or decrease the radial width of the passage 17.

Extending into the inlet of the passage 17 adjacent the upper end of the strip 16 is a vertical chute 20 of rectangular section, down which cigarette packets P are adapted to pass. The chute 20 may be longitudinally twisted, as shown, by an angle of up to 90° to enable packets to be fed to the wheel 10 in a direction other than in the plane of FIG. 1. Opposite the upper end of the strip 16 is a curved triangulated guide 21 extending from the right-hand wall of the chute 20 and straddling the arms 12 of the wheel 10.

Mounted on the chute 20 are two packet detectors 22 which are spaced apart by a distance of some ten packet lengths to monitor the queue of packets formed in the chute.

At the lower end of the passage 17, adjacent to the right of the fixed member 18, is an outlet 23 defined by a vertical stop 24 against which in use the leading ends of successive packets abut. The upper end of the stop 24 has two cut-outs 25 (FIG. 2) through which the forked ends 13 of the spring arms 12 can move.

Under the outlet 23, and spaced by more than the thickness of one packet from the bottom of the stop 24, are a pair of ledges 26 which are fixedly mounted just above the surface of a conveyor band 27. The band 27 is trained around two pulleys 28 (only one shown) and carries a succession of regularly spaced flights or pushers 29.

In operation, packets P are fed in an irregular manner into the top of the chute 20 in a longitudinal direction, i.e. in the direction of one of the narrow packet sides. The packets may be fed intermittently in batches from a reservoir, such as the Molins packet reservoir PACER.

As the packets P pass down the chute 20 they are sensed by the detectors 22, and on meeting the guide 21 each successive packet begins to move towards the left, around the curve of the strip 16 formed by the roller 19. At this point a small gap has been formed between adjacent packets and each packet comes under the influence of one or more of the spring arms 12, whose rounded forked ends 13 engage the rear corners behind the large inner faces of the packets and convey them around the arcuate passage 17.

On reaching outlet 23 the spring arms 12 urge successive packets to move radially away from the wheel 10 to form a short stack abutting against the stop 24 and resting on the ledges 26. From here each lowermost packet is removed by a pusher 29 of the conveyor band 27 and fed in timed succession directly into a wrapping machine.

The speed of the rotation of the wheel 10 is slightly greater than that at which the packets are being removed by the conveyor band 27, so that the stack of packets at the outlet 23 will usually be running full. In this normal situation the rounded ends 13 of the arms 12 will disengage from the rear corners of the packets and will slide forwards with a slow relative speed against the large faces of the packets. By adjusting the roller 19 to slacken the flexible strip 16 and thereby increase the radial width of the passage 17, the forward force exerted by the arms 12 on the packets in the passageway 17 can be reduced.

If the level of packets in the chute 20 is sensed to have descended to the lower of the two detectors 22, then the latter is arranged to reduce the speed of the wrapping machine (including the conveyor band 27), or to momentarily bring it to rest.

It will be appreciated that if it is desired for the packets to enter the wrapping machine upside-down relative to the attitude shown, it is only necessary to disconnect the chute 20 and to turn the axis of the wheel 10 through 180°, so that it rotates clockwise. And in either of such attitudes of the packet it is possible for the packets to enter the wrapping machine with any of its four narrow sides leading, simply by changing the direction of the conveyor band 27 accordingly, i.e. making the band travel to the left, or into or out of the plane of the drawing.

Thus in addition to the variation in packet inlets allowed for by the twisted chute 20, the apparatus can cater for any desired orientation of packets into the wrapping machine. Furthermore the apparatus provides a convenient means of converting an intermittent or irregular flow of packets into a regular timed flow.

It will also be appreciated that by having packets fed to the chute 20 at a high level above that of the operators manning the machines, it is possible to have a neat, unobstructed layout of machines, particularly as the length of the conveyor band 27 from the wrapping machine can be arranged to be very short.

I claim:

1. Apparatus for feeding flat articles, such as cigarette packets, having two major axes parallel to their flat faces, comprising a wheel mounted for rotation about a substantially horizontal axis; driving means for continuously rotating the wheel in a predetermined direction; resilient means formed on the periphery of the wheel for engaging the articles, said resilient means comprising a plurality of equi-spaced resilient arms which in use extend backwards relative to the direction of rotation of the wheel, each arm being provided at its free end with a rounded enlargement which is engageable with the rear of a respective article and can slidably release said article when movement of said article is restrained; an upright inlet chute for leading the articles to the wheel in an orientation parallel to one of said major axes; a short substantially vertical outlet extending radially of the wheel for receiving the articles from the wheel in a direction perpendicular to said two major axes; passage means defining a substantially arcuate passage around the wheel between said inlet chute and said outlet; and horizontal conveyor means mounted beneath the outlet for removing the lowermost articles at least one at a time in a direction parallel to one of said major axes.

2. Apparatus for feeding a succession of articles, each having a pair of opposed flat faces, comprising:
   (a) a rotatably mounted wheel;
   (b) driving means for continuously rotating said wheel;
   (c) wall means spaced from and extending about part of the perimeter of said wheel and defining between said wall means and said perimeter of said wheel an arcuate passage with an inlet for receiving articles at one end of said passage and an outlet for dispensing articles at the opposite end of said passage;
   (d) a plurality of resilient members spaced from each other about the perimeter of said wheel, a portion of each of said resilient members projecting towards said wall means; and
   (e) releasable engaging means on each of said projecting portions of said resilient members adapted to releasably engage a trailing end of an article to push said article through said arcuate passage from said inlet to said outlet and to slidably release said article when movement of said article is restrained.

3. Apparatus as claimed in claim 2, in which the resilient means comprises a plurality of equi-spaced resilient arms which in use extend backwards relative to the direction of rotation of the wheel.

4. Apparatus as claimed in claim 3, in which each arm is provided at its free end with a rounded enlargement which constitutes said releasable engaging means for engaging the trailing end of a respective article.

5. Apparatus as claimed in claim 2, in which said wall means is formed by a flexible strip of low-friction material.

6. Apparatus as claimed in claim 2, in which the angle subtended between the inlet and the outlet is less than about 180° but greater than 90°.

7. Apparatus as claimed in claim 2, in which the inlet comprises an elongated upright chute twisted in a longitudinal direction for leading the articles to the wheel in an orientation parallel to one of said major axes.

8. Apparatus as claimed in claim 7, further comprising at least one article detector disposed on the inlet chute and effective to control the speed of said conveyor means.

9. Apparatus as claimed in claim 5, in which the length of said flexible strip is adjustable, so that said arcuate width of the passage can be varied to alter the forward force of the resilient means engageable with an article in the passage means.

10. Apparatus as claimed in claim 2 wherein said resilient members are adapted to deflect the respective articles from said arcuate passage into said outlet.

11. Apparatus as claimed in claim 2 wherein said articles have two major axes parallel to their flat faces, said apparatus further comprising an inlet chute for feeding articles through said inlet to said arcuate passage in an orientation parallel to one of said major axes and outlet means extending radially with respect to said wheel for receiving said articles from said outlet in a direction perpendicular to said two major axes.

12. Apparatus as claimed in claim 11 wherein said resilient members are adapted to deflect the respective articles from said arcuate passage through said outlet into said radially extending outlet means.

13. A method of feeding a succession of articles comrising:

(a) feeding articles through an inlet;
(b) feeding said articles in succession from said inlet along an arcuate passage between a wall and the perimeter of a rotating wheel to an outlet by releasably engaging the trailing ends of the articles with a plurality of releasable engaging means located on portions of a plurality of resilient members projecting from said rotating wheel; and
(c) withdrawing articles from said outlet;
(d) said articles being pushed by said releasable engaging means through said arcuate passage towards said outlet at a rate faster than said articles are withdrawn from said outlet, and said releasable engaging means slidably releasing articles in said arcuate passage when movement of said articles is restrained.

\* \* \* \* \*